(12) United States Patent
Natsume

(10) Patent No.: US 6,324,306 B1
(45) Date of Patent: Nov. 27, 2001

(54) VARIABLE LENGTH CODE DECODER AND MOVING PICTURE DECODER HAVING VARIABLE LENGTH CODE DECODER

(75) Inventor: Kenichi Natsume, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/221,589

(22) Filed: Dec. 29, 1998

(30) Foreign Application Priority Data

Jan. 27, 1998 (JP) .................................................. 10-014415

(51) Int. Cl.[7] ...................................................... G06K 9/36
(52) U.S. Cl. ............................................. 382/246; 341/67
(58) Field of Search .................................... 382/246, 233, 382/245; 341/67, 65, 63; 358/427, 432, 261.1

(56) References Cited

U.S. PATENT DOCUMENTS

| | | | |
|---|---|---|---|
| 5,321,398 | * | 6/1994 | Ikeda ........................................ 341/67 |
| 5,625,355 | * | 4/1997 | Takeno ..................................... 341/67 |
| 5,696,506 | * | 12/1997 | Yu ............................................. 341/67 |
| 5,892,791 | * | 4/1999 | Moon ...................................... 375/341 |
| 5,933,536 | * | 8/1999 | Fukuzawa ............................. 382/246 |

* cited by examiner

Primary Examiner—Jerome Grant, II
(74) Attorney, Agent, or Firm—Volentine Francos, PLLC

(57) ABSTRACT

In a variable length code decoder, code information containing a variable length code composed of a variable length bit numerical part and a 1-bit sign part is supplied to a decoding unit. A numerical part decoding unit decodes the numerical part and outputs numerical data. A code length decoding unit decodes code length of the variable length code, and outputs a value one less than the code length as code length information. A shift unit shifts the code information by the value of the code length information and outputs the sign part as sign data. Since a sign part decoding circuit having logic gates is not needed, circuit size can be reduced.

25 Claims, 6 Drawing Sheets

| DATA | VARIABLE LENGTH CODE VLC | | | | | NUMERICAL VALUE | | SIGN | CODE LENGTH |
|---|---|---|---|---|---|---|---|---|---|
| | C0 | C1 | C2 | C3 | C4 | D1 | D0 | S | CL |
| −3 | 0 | 0 | 0 | 1 | 1 | 1 | 1 | 1 | 5 |
| −2 | 0 | 0 | 1 | 1 | | 1 | 0 | 1 | 4 |
| −1 | 0 | 1 | 1 | | | 0 | 1 | 1 | 3 |
| 0 | 1 | | | | | 0 | 0 | × | 1 |
| +1 | 0 | 1 | 0 | | | 0 | 1 | 0 | 3 |
| +2 | 0 | 0 | 1 | 0 | | 1 | 0 | 0 | 4 |
| +3 | 0 | 0 | 0 | 1 | 0 | 1 | 1 | 0 | 5 |

*FIG. 2*

| DATA | VARIABLE LENGTH CODE VLC C0........C10 | NUMERICAL VALUE D4···D0 | SIGN S | CODE LENGTH CL |
|---|---|---|---|---|
| -16 | 00000011001 | 10000 | 1 | 10 |
| -15 | 00000011011 | 01111 | 1 | 10 |
| -14 | 00000011101 | 01110 | 1 | 10 |
| -13 | 00000011111 | 01101 | 1 | 10 |
| -12 | 00000100001 | 01100 | 1 | 10 |
| -11 | 00000100011 | 01011 | 1 | 10 |
| -10 | 0000010011 | 01010 | 1 | 9 |
| -9 | 0000010101 | 01001 | 1 | 9 |
| -8 | 0000010111 | 01000 | 1 | 9 |
| -7 | 00000111 | 00111 | 1 | 7 |
| -6 | 00001001 | 00110 | 1 | 7 |
| -5 | 00001011 | 00101 | 1 | 7 |
| -4 | 0000111 | 00100 | 1 | 6 |
| -3 | 00011 | 00011 | 1 | 4 |
| -2 | 0011 | 00010 | 1 | 3 |
| -1 | 011 | 00001 | 1 | 2 |
| 0 | 1 | 00000 | × | 0 |
| +1 | 010 | 00001 | 0 | 2 |
| +2 | 0010 | 00010 | 0 | 3 |
| +3 | 00010 | 00011 | 0 | 4 |
| +4 | 0000110 | 00100 | 0 | 6 |
| +5 | 00001010 | 00101 | 0 | 7 |
| +6 | 00001000 | 00110 | 0 | 7 |
| +7 | 00000110 | 00111 | 0 | 7 |
| +8 | 0000010110 | 01000 | 0 | 9 |
| +9 | 0000010100 | 01001 | 0 | 9 |
| +10 | 0000010010 | 01010 | 0 | 9 |
| +11 | 00000100010 | 01011 | 0 | 10 |
| +12 | 00000100000 | 01100 | 0 | 10 |
| +13 | 00000011110 | 01101 | 0 | 10 |
| +14 | 00000011100 | 01110 | 0 | 10 |
| +15 | 00000011010 | 01111 | 0 | 10 |
| +16 | 00000011000 | 10000 | 0 | 10 |

*FIG. 4*

VARIABLE LENGTH CODE DECODER AND MOVING PICTURE DECODER HAVING VARIABLE LENGTH CODE DECODER

BACKGROUND OF THE INVENTION

1. Field of the Invention

The present invention relates to a variable length code decoder which outputs from a variable length code having a variable length code part and a sign bit for indicating the sign of the code a fixed length code associated with the code part and the sign bit.

2. Description of the Prior Art

A variable length code increases its coding efficiency by assigning a short code to an event that has a high probability of occurrence and reduces the average code length. Hence, variable length codes are widely used to codify pictures that need to be coded with a high efficiency. As examples of coding systems which perform variable length coding, MPEG (Moving Picture Expert group) and H.261 and the like are currently used widely for systems which record or transmit moving pictures.

Decoders which reproduce moving pictures coded by such coding systems are installed in various AV products. It is desirable that the costs and power consumption of these products be low. Therefore, it is desirable that the structures and constitutive components of such decoders be simplified.

FIG. 1 shows the configuration of a conventional decoder 100. FIG. 2 shows variable length codes that the decoder 100 shown in FIG. 1 processes.

The decoder 100 shown in FIG. 1 has a code buffer 1 to which the variable length codes VLC shown in FIG. 2 are input, a shift unit 2 to which the variable length codes VLC are supplied serially via the code buffer 1, and a control unit 3 which controls the code buffer 1 and shift unit 2.

Each of the variable length codes VLC shown in FIG. 2 has a numerical part and a 1-bit sign part. The numerical part has been codified in accordance with the absolute value of the data, forming a variable length code. The sign part represents the sign of the data and is provided after the numerical part.

A decoding unit 10 having a numerical part decoding unit 41, a sign decoding unit 12, and a code length decoding unit are connected to the shift unit 2. The numerical part decoding unit 41 receives 5-bit code information C0, C1, C2, C3, and C4 from the shift unit 2, decodes the significant numerical part of this code information, and outputs binary numerical data D0 and D1. The numerical part decoding unit 41 is constructed by combining inverters 41a, 41b, and 41c, logic product gates 41d, 41e, 41f, and 41g (hereafter, these logic product gates will be referred to as AND), and logic sum gates 41h and 41i (hereafter, these logic sum gates will be referred to as OR).

The sign decoding unit 12 decodes the sign of the code information C0 through C4 supplied from the shift unit 2 and outputs sign data S. The sign decoding unit 12 is constructed by combining AND logic gates 12a, 12b, and 12c with an OR logic gate 12d. The code length decoding unit 42 decodes the number of bits that constitute one variable length code VLC based on the code information C0 through C4 supplied from the shift unit 2, and outputs a code length information CL. Like the data decoding unit 41 and sign decoding unit 12, the code length decoding unit 42 is constructed by combining several logic gates.

The output terminal of the code length decoding unit 42 is connected to the control unit 3. The control unit 3 sequentially supplies variable length codes VLC to the code buffer 1 based on the code length information CL to have the code buffer 1 read in the variable length codes VLC. In addition, the control unit 3 controls the shift unit 2 so as to make the shift unit 2 shift the received information by a prescribed number of bits. The 5-bit code information C0 through C4 is then supplied to the decoding unit 10.

Next, the operation will be explained in which the variable length codes VLC corresponding to the data "+1", "−3", and "−2" others are sequentially input to the code buffer 1 in this order. As shown in FIG. 2, the variable length codes VLC that correspond to the data "+1", "−3", and "−2" are "010", "00011", and "0011", respectively. Hence, these data are combined to produce a code "010000110011" and a subsequent variable length code (for example, 00011 . . . ) which are stored in the code buffer 1. The code "010000110011" stored in the code buffer 1 is then supplied serially to the shift unit 2. The first five bits 01000 of the code "010000110011" supplied to the shift unit 2 is then sent as code information C0 through C4 to the decoding unit 10.

The numerical part decoding unit 41 of the decoding unit 10 decodes the numerical part of the data "+1", and outputs "1" and "0" as numerical data D0 and D1, respectively. Meanwhile, the sign decoding unit 12 decodes the sign of the data "+1", and outputs "0" as sign data S. In addition, the code length decoding unit 42 decodes the code length of the data "+1", and outputs "3" as a code length information CL.

The code length information CL (=3) obtained by decoding the data "+1" is supplied to the control unit 3. The control unit 3 then controls the shift unit 2 so that the shift unit 2 will shift the variable length code VLC "010000110011" inside the shift unit 2 by three bits to the left. The first five bits of the post-shift variable length code VLC are "00011". These five bits are then supplied as code information C0 through C4 to the decoding unit 10. In other words, this code information C0 through C4 is the variable length code VLC of the second data "−3". Therefore, the decoding unit 10 decodes the data "−3", and outputs "1" and "1" as numerical data D0 and D1, respectively, "1" as sign data S, and "5" as a code length information CL.

The code length information CL (=5) obtained by decoding the data "−3" is supplied to the control unit 3. The control unit 3 then controls the shift unit 2 so that the shift unit 2 will shift the variable length code VLC inside the shift unit 2 by five bits to the left. The first five bits of the post-shift variable length code VLC are "00110". These five bits are then supplied as code information C0 through C4 to the decoding unit 10. In other words, this code information C0 through C4 is the variable length code VLC of the third data "−2". Therefore, the decoding unit 10 decodes the data "−2", and outputs "0" and "1" as numerical data D0 and D1, respectively, "1" as sign data S, and "4" as a code length information CL.

The above-described process is repeated to sequentially decode the variable length codes VLC input to the code buffer 1.

However, according to the above-described conventional decoder, as the number of variable length codes increases, the circuit size of the decoding unit must be increased, which is a problem.

For example, a valiable length code coded by the MPEG (Moving Picture Expert Group) system that is used to code moving pictures has several hundred codes. Therefore, the circuit size of the variable length code decoding unit has to be increased, which results in an increased amount of power consumption.

Given these circumstances, it is an object of the present invention to provide variable length code decoders having a simple circuit structure. It is also an object of the present invention to provide moving picture decoders in which such variable length code decoders are used.

SUMMARY OF THE INVENTION

According to the first aspect of the present invention, the variable length code decoder converts a variable length code into a fixed-length binary value and sign data. The decoder has a shifter which inputs the variable length code, shifts the variable length code by a designated number of bits to produce a shifted code; a decoding unit which receives the shifted code from the shifter, outputs a prescribed bit of the shifted code as the sign data and decodes the shifted code for outputting a code length and the fixed-length binary value of the shifted code; and a shift control unit which outputs the designated number of bits to the shifter based on the code length.

The decoder may further has a code buffer for temporarily holding the variable length code; and a controller which outputs a timing signal to the code buffer based on the code length for controlling an output timing of the variable length code. The shift control unit may further produce a carry and the controller may output the timing signal based on the code length and the carry.

The code buffer may have a first register which temporarily holds the variable length code and a second register which receives the variable length code temporarily held in the first register and successively holds the variable length code. The first and second registers may supply the variable length codes held in the first and second registers to the shifter in parallel. The first and second registers may include flip-flops.

The shifted code may include a numerical part of the variable length code and the fixed length binary value may consist of the sign data and a fixed length numerical value. The decoding unit may have a numerical part decoding unit for decoding the numerical part to produce the fixed length numerical value; a code length decoding unit which produces the code length of bits that constitute the variable length code based on the numerical part; and a shift unit for receiving the shifted code from the shifter and outputting the prescribed bit as the sign data.

The numerical part decoding unit can be a logic circuit including a inverter, logic products gate, and logic sum gate. The code length decoding unit can be a logic circuit including an inverter, logic products gate, and logic sum gate. A value of the code length can be smaller than an actual code length of the variable length code by one. The shift unit may input the shifted code and the code length and output a first bit of the shifted code as the sign data.

The code length decoding unit can be connected to the shift control unit.12. The shift control unit may have an adder which adds up the code length and outputs a result of the addition operation and a carry; and a shift length register for receiving the result of the addition operation and outputting the designated number of bits. The adder may receive the code length and the designated number of bits and outputs the carry to the controller. The shift unit may shift the shifted code that contains the variable length code based on the code length and outputs a post-shift first bit as the sign data.

According to the second aspect of the present invention, the decoder loads the variable length code into a code buffer, transfers the variable length code from the code buffer to a shifter, shifts the variable length code transferred to the shifter by a designated number of bits to produce a shifted code, outputs a prescribed bit of the shifted code as the sign data, and decodes the shifted code for outputting the fixed-length binary value.

The decoder may further produce a code length of the shifted signal, add up the code length and outputting an addition result, and output the designated number of bits based on the addition result. The adding step may further produce a carry, and the decoder may further determine a value of the carry, input the variable length code of one word length to the code buffer and transfer contents of the code buffer to the holding unit if the carry is "1". The loading step may load the variable length code into the first and second registers and transfer the variable length code from the first and second registers to the shifter in parallel. The decoder may further control the code buffer based on the code length and the carry.

According to the third aspect of the present invention, the video decoder decodes a bit stream of a video transformed into compressed codes using a discrete cosine transform, and outputs an uncompressed digital video signal. The video decoder has an interface which receives the bit stream; a controller which examines the bit stream and selects a variable length code; a variable length code decoder unit which decodes the variable length code and outputs fixed length codes; an inverse quantizer which quantizes discrete cosine transform coefficients including the fixed length codes to produce a discrete cosine transform block; and an inverse discrete cosine transform unit which applies an inverse discrete cosine transform on the discrete cosine transform block.

BRIEF DESCRIPTION OF THE DRAWING

Further objects and advantages of the present invention will be apparent from the following description of the preferred embodiments of the invention as illustrated in the accompanying drawing, in which:

FIG. 2 is a diagram showing an exemplary set of variable-length codes applicable to the variable-length code decoder of FIG. 1;

FIG. 4 is a diagram showing an exemplary set of variable-length codes applicable to the variable-length code decoder of FIG. 3;

The same elements shown in more than one figure are designated by the same reference numerals.

DETAILED DESCRIPTION OF THE INVENTION

Figure 1:
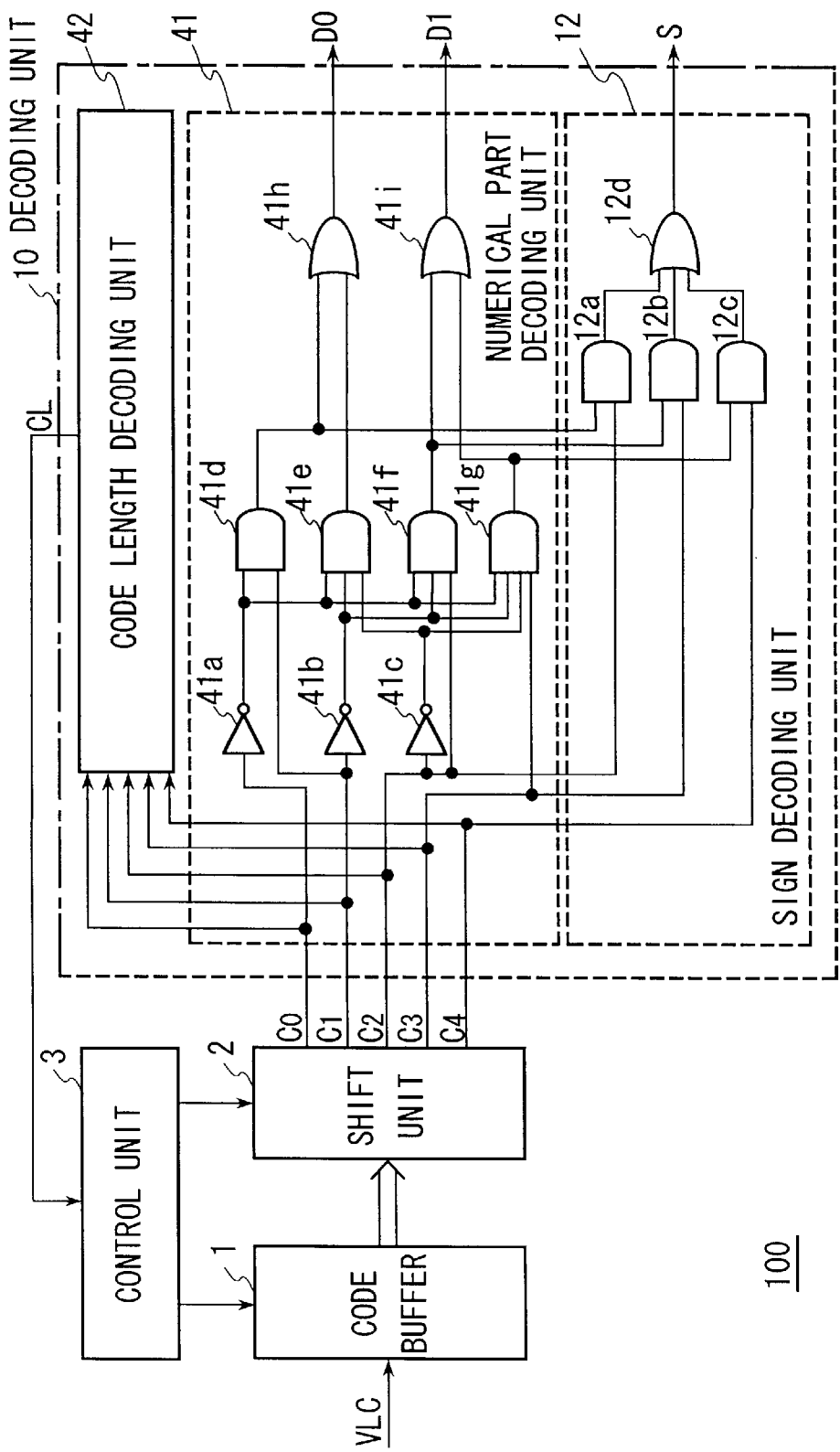
FIG. 1 is a block diagram showing an example of a conventional variable-length code decoder.
Figure 3:
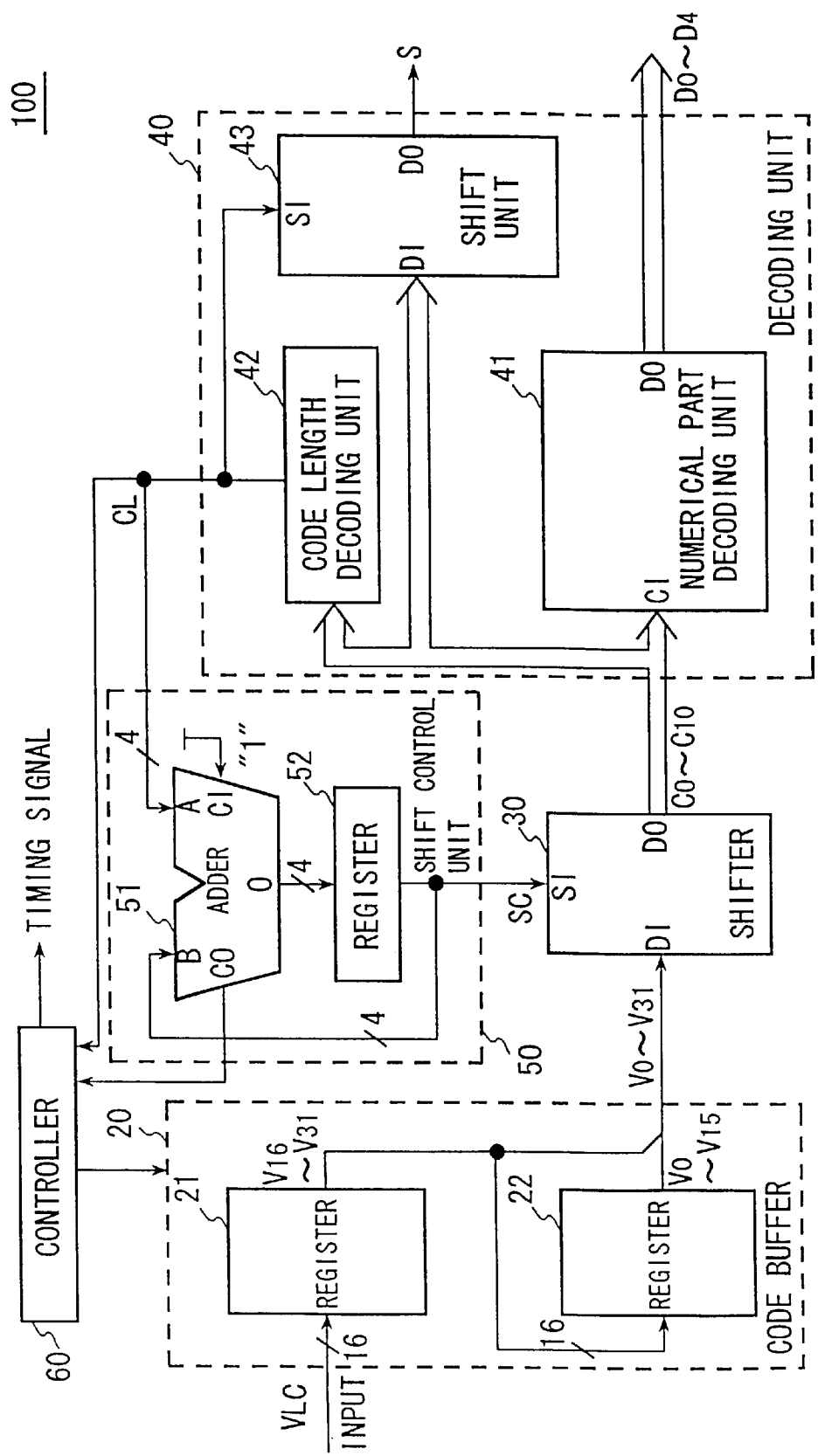
FIG. 3 is a schematic block diagram showing an arrangement of a variable-length code decoder according to a preferred embodiment of the invention.

FIG. 3 shows the configuration of a decoding circuit 100 according to an embodiment of the present invention. FIG. 4 shows an example of a variable length code table of a variable length code coded by the MPEG system. As shown in FIG. 4, the motion vector has a numerical part that has been coded in a variable length manner in accordance with the absolute value of the data and a 1-bit sign part for indicating the sign of the data that is provided after the numerical part.

The decoding circuit 100 shown in FIG. 3 has a code buffer 20, a shifter 30 having an data input terminal DI connected to the output terminal of the code buffer 20 and a shift control input terminal SI, a decoding unit 40 which performs variable length decoding and is connected to the output terminal of the shifter 30, a shift control unit 50 which outputs a shift control signal SC based on a code length information supplied from the decoding unit 40, and a controller 60 for controlling the code buffer 20 based on the code length information supplied from the decoding unit 40 and a carry output supplied from the shift control unit 50 and for outputting a timing signal.

The code buffer 20 is constructed by vertically connecting a 16-bit register 21 with another 16-bit register 22. The code buffer 20 holds a 2-word (32-bit) variable length code VLC and then outputs the 2-word (32-bit) variable length code VLC as a 32-bit parallel code V0 through V31. The input terminal DI of the shifter 30 is connected to the output terminal of the code buffer 20.

The shifter 30 has an output terminal DO in addition to the above-mentioned shift control input terminal SI and input terminal DI. The shifter 30 shifts the parallel code V0 through V31 by a designated number of bits in accordance with a shift control signal SC supplied to the shift control input terminal SI and outputs the first eleven bits of the post-shift code as code information C0 through C10 from the output terminal DO.

The output terminal DO of the shifter 30 is connected to the decoding unit 40. The decoding unit 40 has a numerical part decoding unit 41, a code length decoding unit 42, and a shift unit 43 as a sign outputting means. The numerical part decoding unit 41 decodes the numerical part of the variable length code VLC contained in the 11-bit code information C0 through C10 supplied from the shifter 30, and outputs the decoded numerical part as binary numerical data D0 through D4. The numerical part decoding unit 41 is constructed by combining logic gates such as inverters, AND, OR, and the like. The numerical part decoding unit 41 generates numerical data D0 through D4 in accordance with the variable length code table shown in FIG. 4.

The code length decoding unit 42 is also constructed by combining several logic gates like the numerical part decoding unit 41. The code length decoding unit 42 decodes the number of bits that constitute the variable length code VLC contained in the code information C0 through C10 supplied from the shifter 30, and outputs the decoded data as a code length information CL. However, it is to be noted that the value of the code length information CL is smaller than the actual code length by one.

The shift unit 43 has an input terminal DI to which the code information C0 through C10 is input in parallel, a shift control input terminal SI to which the code length information CL is input, and an output terminal DO which outputs the first bit of the post-shift code as sign data S.

The output terminal of the code length decoding unit 42 is connected to the shift control unit 50. The shift control unit 50 has an adder 51 and a register 52. The adder 51 has input terminals A and B, a carry input terminal CI, an output terminal O, and an carry output terminal CO. The code length information CL is supplied to the input terminal A of this adder 51. The adder 51, which is a 4-bit adder, adds data supplied to the input terminals A and B, and carry input terminal CI. The adder 51 then outputs the 4-bit result of the addition operation from the output terminal O. The adder 51 also outputs carried information CAR from the carry output terminal CO. The carry input terminal CI of the adder 51 is fixed-connected so that "1" is always input. The carry output terminal CO is connected to data transfer circuits (not shown in FIG. 3) of the registers 21 and 22 of the code buffer 20. The output terminal O of the adder 51 is connected to the input terminal of the register 52. The output terminal of the register 52 is connected to the input terminal B of the adder 51 and to the shift control input terminal SI of the shifter 30.

Figure 5:
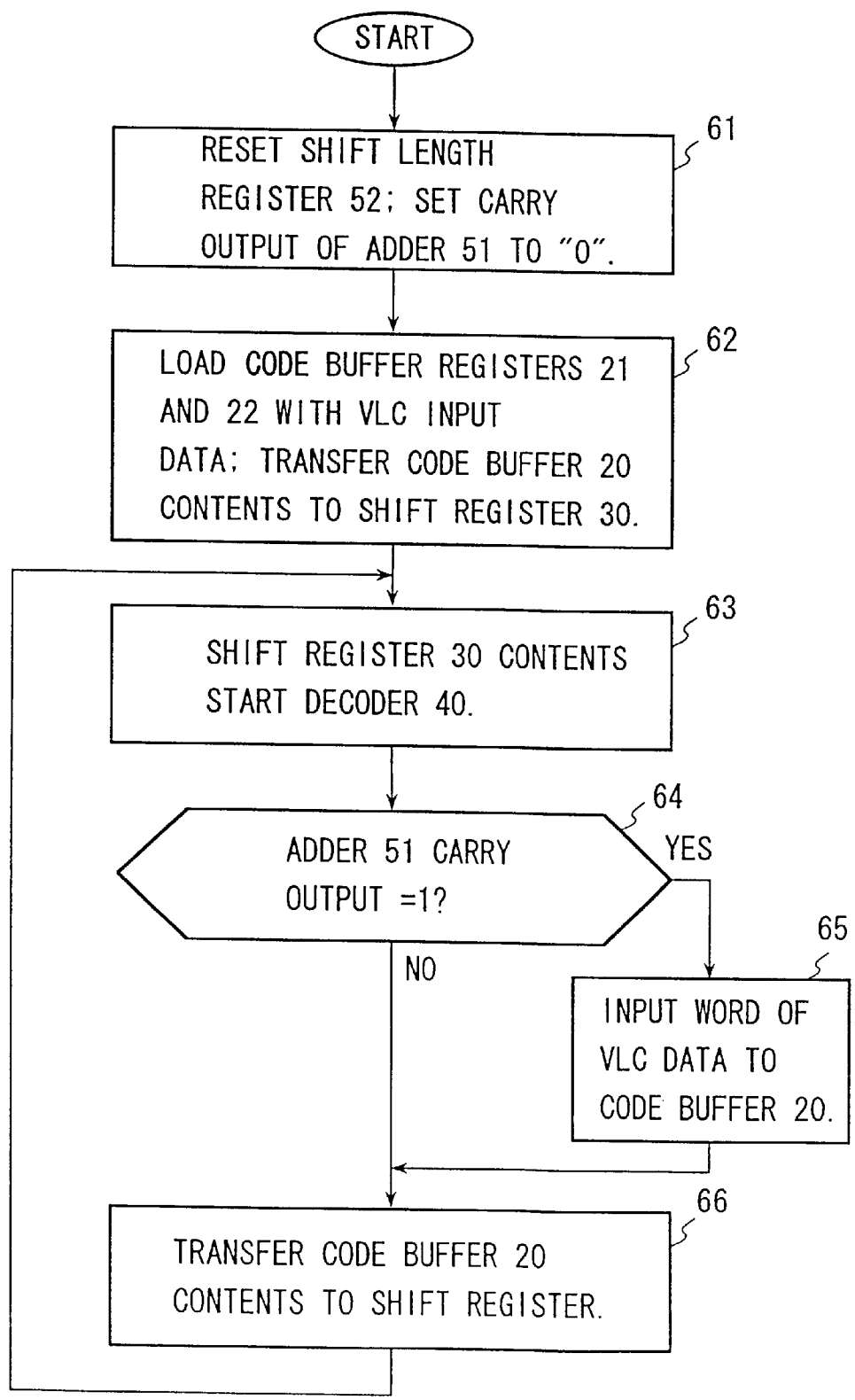
FIG. 5 is a flowchart showing an exemplary operation of the controller 60 of FIG. 4.

Next, with reference to FIG. 4, the operation in the case in which variable length codes VLC that correspond to the data "+10", "−8", "−12", "+3", and so on are sequentially input to the code buffer 20 will be explained. FIG. 5 shows an exemplary operation of the controller 60. When the power source of the system is turned on or reset, the controller 60 starts the operation described in FIG. 5. First, in step 61, the shift length register 52 is set to 0, and the carry output terminal CO of the 4-bit adder 51 is set to 0.

Next, step 62 is performed. As shown in FIG. 4, the variable length codes VLC that correspond to the data "+10", "−8", "−12", "+3", and so on are "0000010010", "0000010111", "00000100001", "00010", and so on, respectively. These variable length codes VLC are arranged in a sequence in this order. The first sixteen bits "0000010010000001" of this sequence is stored in the register 22. The next sixteen bits of this sequence "0111000001000010", that is from the seventeenth bit to the $32^{nd}$ bit, are then stored in the register 21. After this, the contents of the registers 22 and 21 are output in parallel as parallel codes V0 through V15 and parallel codes V16 through V31, respectively.

In step 63, the shift control unit 50 sends a shift signal SC to the shifter 30. In accordance with the received shift signal SC, the shifter 30 shifts the input data V0 through V31. However, since SC=0 here, the input data V0 through V31 are not shifted. The first eleven bits (which is the maximum code length) "00000100100" are input as code information C0 through C10 to the coding unit 40. Subsequently, the decoding unit 40 starts to decode the codes received from the shifter 30.

Next, the numerical part decoding unit 41 of the decoding unit 40 decodes the numerical part of the first data "+10", and outputs "0", "1", "0", "1", and "0", as numerical data D0, D1, D2, D3, and D4, respectively. Meanwhile, the code length decoding unit 42 decodes the code length of the data "+10", and outputs the decoded code length as code length information CL to the shift control input terminal SI of the shift unit 43. The shift unit 43 shifts by nine bits the 11-bit code information C0 through C10 supplied from the shifter 30. The post-shift first bit, that is, the code information C9 is output as sign data S. Thus, "0" is output as the sign data S.

Hence, according to the present embodiment, the code length decoding unit 42 outputs a value CL that is smaller than the code length by 1 (this is the code length of the code unit). Therefore, when the shift unit 43 shifts the code information received from the shifter 30 by the value of CL that is input to the shift control input terminal SI, the sign bit appears as the first bit in the shift unit 43.

On the other hand, the code length information CL (=9) output from the code length decoding unit 42 is supplied to the input terminal A of the adder 51. Since the value "0" of the register 52 is supplied to the input terminal B of the adder 51 and the value "1" is supplied to the carry input terminal CI of the adder 51, the value "10", that is, the code length of the data "+10" is output from the output terminal O of the adder 51.

The controller 60 detects the code length information supplied from the code length decoding unit 42. Then in step 64, the controller 60 determines whether the carry output of the adder 51 is 1 or not. If the carry output of the adder 51 is 1, the controller 60 inputs a variable length code of one word length to the code buffer 20 in step 65, proceeds to step 66, and transfers the contents of the code buffer 20 to the shifter 30. Otherwise, the controller 60 proceeds directly to step 66, and transfers the contents of the code buffer 20 to the shifter 30. The controller 60 then returns to step 63, and repeats the same procedures.

The shifter 30 shifts the parallel code V0 through V31 by ten bits in accordance with the shift control signal SC supplied from the shift control unit 50 to the shift control input terminal SI of the shifter 30. As a result, the code "0000010111" of the second data "−8" and a portion of the code of the third data "−12" are output as code information C0 through C10 to the decoding unit 40.

The numerical part decoding unit 41 decodes the numerical part of the second data "−8", and outputs "0", "0", "0", "1", and "0" as the decoded numerical data D0, D1, D2, D3, and D4, respectively. Meanwhile, the code length decoding unit 42 decodes the code length of the data "−8", and outputs "9" as the decoded code length information CL to the shift control input terminal Si of the shift unit 43. The shift unit 43 then shifts by nine bits the code information C0 through C10 supplied from the shifter 30, and outputs the post-shift first bit, that is, the information C9 as the sign data S. In this way, "1" is output as the sign data S.

On the other hand, the code length information CL (=9) output from the code length decoding unit 42 is supplied to the input terminal A of the adder 51. Since the value "10" of the register 52 is supplied to the input terminal B of the adder 51 and the value "1" is supplied to the carry input terminal CI of the adder 51, the adder 51 yields "20" as a result of the addition.

Hence, the carry output terminal C0 of the adder 51 outputs carry information CAR, and the 4-bit output terminal O outputs a value "4". The value "4" output from the output terminal O of the adder 51 is held in the register 52 and is supplied as a shift control signal SC to the shifter 30. This value "4" of the shift control signal SC becomes the last four bits of the sum of the code lengths of the data "+10" and "−8".

When the second data "−8" is decoded and the carry information CAR from the adder 51 becomes "1", a transfer control signal not shown in the drawing is supplied to the registers 21 and 22. As a result, the content of the register 21 is transferred to the register 22. The register 21 then holds a new 16-bit variable length code VLC.

After the parallel code V0 through V31 held in the code buffer 20 is renewed by sixteen bits, the content of the code buffer 20 is loaded to the shifter 30 in accordance with a control by the controller 60. The parallel code V0 through V31 loaded to the shifter 30 is then shifted by four bits in accordance with the shift control signal SC supplied to the shift control input terminal SI. As a result, the code "00000100001" of the third data "−12" is supplied as code information C0 through C10 to the decoding unit 40.

The numerical part decoding unit 41 decodes the numerical part of the third data "−12", and outputs "0", "0", "1", "1", and "0" as the decoded numerical data D0 through D4. Meanwhile the code length decoding unit 42 decodes the code length of the data "−12", and outputs "10" as the code length information CL to the shift control input terminal Si of the shift unit 43. The shift unit 43 then shifts by ten bits the 11-bit code information C0 through C10 supplied from the shifter 30 and outputs the post-shift first bit, that is, the code information C10 as the sign data S. Thus, "1" is output as the sign data S.

On the other hand, the code length information CL (=10) output from the code length decoding unit 42 is supplied to the input terminal A of the adder 51.

Since the value "4" of the register 52 is supplied to the input terminal B of the adder 51 and the value "1" is supplied to the carry input terminal CI, the output terminal O of the adder 51 outputs "15" as the result of the addition. The value "15" output from the output terminal O of the adder 51 is held in the register 52 and is supplied as a shift control signal SC to the shifter 30. This value "15" of the shift control signal SC becomes the last four bits of the sum of the code lengths of the data "+10", "−8", and "−12".

When the third data "−12" has been decoded, the content of the code buffer 20 is again loaded to the shifter 30 in accordance with a control from the control unit 60. The parallel code V0 through V31 loaded to the shifter 30 is shifted by fifteen bits in accordance with the shift control signal SC supplied to the shift control input terminal SI. Thus, the code "00010" of the fourth data "+3" and a portion of the fifth and other remaining data are supplied as code information C0 through C10 to the decoding unit 40.

By repeating the above-described operations, the variable length codes VLC are sequentially decoded. As a result, numerical part data D0 through D4 and sign data S of each data, which indicate the absolute value and sign of the data, respectively, are obtained.

It should be noted that the range of technical applications of the present invention is not limited to the above-described embodiment. Other variations and modifications of the above-described embodiment can be achieved as follows.

For example, the number of bits of the code buffer 20, the capacitance of the shifter 30, the number of digits of the adder 51, and the like are not limited to the numerical values used in the embodiment. These numerical values can be determined in accordance with the maximum number of bits of the variable length code VLC to be processed. For example, if the word length W is $2^N$, the maximum permissible code length L can be determined on the condition that L≦W. In this case, the lengths of the registers 21 and 22, shifter 30, shift unit 43, adder 51, and register 52 are set to W, W, 2W, L, N, and N, respectively.

In the embodiment, the shifter 30 is configured to output code information C0 through C10 based on the parallel code V0 through V31. However, for example as an alternative, a selector for generating a selection control signal may be connected to the shifter 30 so that the shifter 30 will select and output code information C0 through C10 based on the selection control signal.

The shift unit 43 in the embodiment is configured to shift the code information C0 through C10 by the number designated by the code length information CL using the shifter 30 and to output the sign data S. However, for example as an alternative, a selector for generating a selection control signal may be connected to the shift unit 43 so that the shift unit 43 will select and output the sign data S based on the selection control signal.

Not only the variable length codes VLC but also fixed length codes can be decoded. However, in decoding fixed length codes, the code length decoding unit 42 and the shift control unit 50 are not needed. In this case, the shifter 30 and the shift unit 43 function as fixed shift circuits.

The applicability of the present invention is not limited to the variable length codes shown in FIG. 4. In other words, the present invention can be applied to any variable length code system in which a sign bit is attached to the variable length code part of each variable length code. For example, the present invention can be applied to process DCT (discrete cosine transform) coefficients generated by discrete cosine transforms that are widely used to compress the space of moving pictures. In other words, the present invention can be applied to a code system in which a variable length code is assigned to a combination of RUN and LEVEL of the DCT coefficient. In addition, the present invention can be applied to a MPEG system which uses variable length codes for MBAI (Address Increment), MBT (Macro-block Type), and CBP (Coded Block Pattern).

Figure 6:
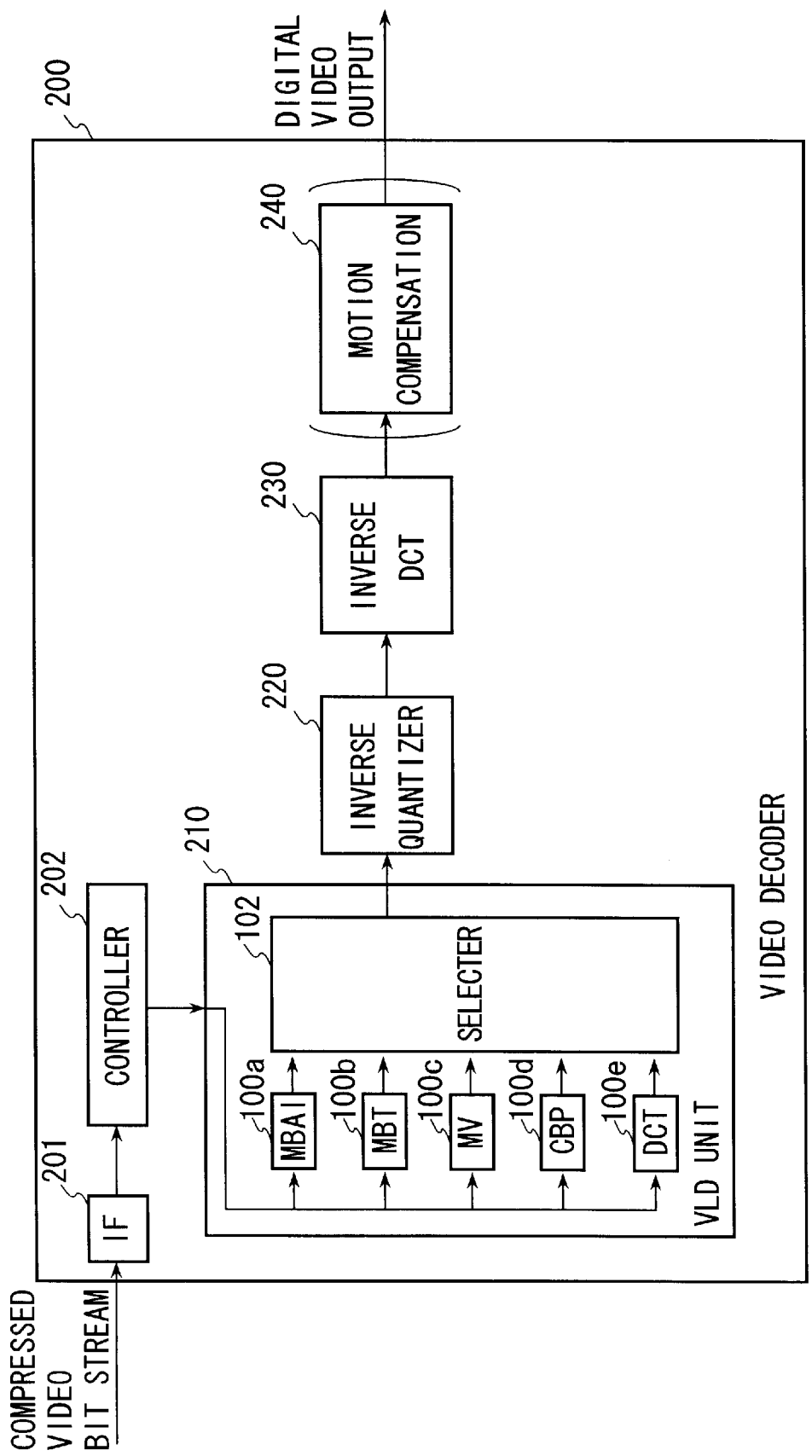
FIG. 6 is a schematic block diagram showing an exemplary arrangement of a video decoder incorporating a variable-length code decoder in accordance with the invention.

FIG. 6 is a block diagram of a video decoder 200 in which a variable length code decoder according to the present embodiment is used. The video decoder 200 decodes a bit stream of a video transformed into compressed codes using a DCT, and outputs a decompressed digital video signal. As compression coding systems that use DCT, currently in use are the MPEG, the H.261, the DV (a standard for video cassette recorders) format, and the like. In FIG. 6, the video decoder 200 has an interface (IF) 201, a controller 202, a variable length decoder (VLD) unit 210, an inverse quantizer 220, and an inverse DCT 230. A motion compensation unit 240 is further installed in the video decoder 200 in applying the present invention to a system in which the format of the input video performs motion compensation (for example, MPEG and H.261).

The VLD unit 210 contains VLD decoders MBAI 100a, MBT 100b, MV 100c, CBP 100d, DCT 100e, and a selector 102. Data is input to each of the VLD decoders MBAI 100a, MBT 100b, MV 100c, CBP 100d, and DCT 100e in which the data is decoded. The selector 102 then selects the decoded data. If the selected VLD is MV, the VLD unit 210 outputs the selected VLD to the motion compensation unit 240. If the selected VLD is DCT, the VLD unit 210 outputs the selected VLD to the inverse quantizer unit 220.

In order to have the video decoder 200 perform motion compensation, the motion vector variable length decoder (MV VLD) 100 shown in FIG. 3 is also installed in the VLD unit 210.

The bit streams transformed into compressed codes contain variable length codes associated with combinations of RUN and LEVEL of successive DCT coefficients. The bit streams transformed into the compressed codes are supplied to the controller 202 via the interface 201. The controller 202 examines the bit streams, selects various variable length codes to be processed in the VLD unit 210, and send them to the VLD unit 210. In the VLD unit 210, the variable length decoders 100a, 100b, 100c, 100d, and 100e then decode assigned variable length codes, and output corresponding fixed-length codes.

For example, when the DCT VLD 100e receives a DCT coefficient variable length code, a numerical part decoding unit (not shown in the drawing) inside the DCT VLD 100e associates this DCT coefficient variable length code with a fixed length code. The DCT VLD 100e then outputs this fixed length code. It is desirable that RUN be represented by the lower bits of the fixed length code to be output, and that the highest bit represent the sign of LEVEL.

The inverse quantizer 220 then quantizes the DCT coefficients to produce a DCT block composed of DCT coefficients. The inverse DCT 230 then performs an inverse DCT on the DCT block. If the post-transform DCT block is not motion-compensated (in the case of the DV format), the post-trans form DCT block is reverted to uncompressed digital pictures. In the case of the MPEG and H. 261, the motion compensation unit 240 motion-compensates the post-transform DCT block using motion vectors, and restores normal uncompressed digital pictures. The motion vectors are supplied from the MV VLD 100c of the VLD unit 210.

In this way, the decoding circuit according to the present embodiment has a code length decoding unit 42 and a shift unit 43 which outputs sign data S by shifting code length information C0 through C10 containing a variable length code VLC based on code length information CL decoded by the code length decoding unit 42. Therefore, a sign decoding unit constructed by combining many logic gates is not needed. As a result, the circuit structure is simplified and the power consumption is reduced.

Many different embodiments of the present invention may be constructed without departing from the spirit and scope of the present invention. It should be understood that the scope of the present invention is not limited to the specific embodiments described in the specification and is defined by the appended claims.

What is claimed is:

1. A variable length code decoder capable of converting a variable length code into a fixed-length binary value and sign data, comprising:

a shifter which has said variable length code as an input, and shifts said variable length code by a designated number of bits to produce a shifted code;

a decoding unit which receives said shifted code from said shifter, outputs a prescribed bit of said shifted code as said sign data and decodes said shifted code for outputting a code length and said fixed-length binary value of said shifted code; and a shift control unit which outputs said designated number of bits to said shifter based on said code length.

2. A variable length code decoder as claimed in claim 1, further comprising:

a code buffer for temporarily holding said variable length code; and a controller which outputs a timing signal to said code buffer based on said code length for controlling an output timing of said variable length code.

3. A variable length code decoder as claimed in claim 2, wherein:

said shift control unit further produces a carry; and said controller outputs said timing signal based on said code length and said carry.

4. A variable length code decoder capable of converting a variable length code into a fixed-length binary value and sign data, comprising:

a shifter which has said variable length code as an input, and shifts said variable length code by a designated number of bits to produce a shifted code;

a decoding unit which receives said shifted code from said shifter, outputs a prescribed bit of said shifted code as said sign data and decodes said shifted code for outputting a code length and said fixed-length binary value of said shifted code;

a shift control unit which outputs said designated number of bits to said shifter based on said code length;

a code buffer for temporarily holding said variable length code; and a controller which outputs a timing signal to said code buffer based on said code length for controlling an output timing of said variable length code,
wherein said code buffer includes,
a first register which temporarily holds said variable length code, and
a second register which receives said variable length code temporarily held in said first register and successively holds said variable length code,
wherein said first and second registers supply said variable length codes held in said first and second registers to said shifter in parallel.

5. A variable length code decoder as claimed in claim 4, wherein said first and second registers include flip-flops.

6. A variable length code decoder capable of converting a variable length code into a fixed-length binary value and sign data, comprising:
a shifter which has said variable length code as an input, and shifts said variable length code by a designated number of bits to produce a shifted code;
a decoding unit which receives said shifted code from said shifter, outputs a prescribed bit of said shifted code as said sign data and decodes said shifted code for outputting a code length and said fixed-length binary value of said shifted code; and
a shift control unit which outputs said designated number of bits to said shifter based on said code length,
said shifted code including a numerical part of said variable length code, and said fixed length binary value consists of said sign data and a fixed length numerical value, wherein said decoding unit including
a numerical part decoding unit for decoding said numerical part to produce said fixed length numerical value,
a code length decoding unit which produces said code length of bits that constitute said variable length code based on said numerical part, and
a shift unit for receiving said shifted code from said shifter and outputting said prescribed bit as said sign data.

7. A variable length code decoder as claimed in claim 6, wherein said numerical part decoding unit is a logic circuit including an inverter, a logic products gate, and a logic sum gate.

8. A variable length code decoder as claimed in claim 6, wherein said code length decoding unit is a logic circuit including an inverter, a logic products gate, and a logic sum gate.

9. A variable length code decoder as claimed in claim 6, wherein a value of said code length is smaller than an actual code length of said variable length code by one.

10. A variable length code decoder as claimed in claim 6, wherein said shift unit has said shifted code and said code length input thereto and outputs a first bit of said shifted code as said sign data.

11. A variable length code decoder as claimed in claim 6, wherein said code length decoding unit is connected to said shift control unit.

12. A variable length code decoder as claimed in claim 11, wherein said shift control unit has:
an adder which adds up said code length and outputs a result of said addition operation and a carry; and
a shift length register for receiving said result of said addition operation and outputting said designated number of bits.

13. A variable length code decoder as claimed in claim 12, wherein said adder receives said code length and said designated number of bits and outputs said carry to said controller.

14. A variable length code decoder as claimed in claim 11, wherein said shift unit shifts said shifted code that contains said variable length code based on said code length and outputs a post-shift first bit as said sign data.

15. A decoding method of a variable length code into a fixed-length binary value and sign data by a variable length code, said method comprising the steps of:
loading said variable length code into a code buffer;
transferring said variable length code from said code buffer to a shifter;
shifting said variable length code transferred to said shifter by a designated number of bits to produce a shifted code;
outputting a prescribed bit of said shifted code as said sign data; and
decoding said shifted code for outputting said fixed-length binary value.

16. A decoding method of a variable length code into a fixed-length binary value and sign data by a variable length code, comprising:
loading said variable length code into a code buffer;
transferring said variable length code from said code buffer to a shifter;
shifting said variable length code transferred to said shifter by a designated number of bits to produce a shifted code;
outputting a prescribed bit of said shifted code as said sign data;
decoding said shifted code for outputting said fixed-length binary value;
producing a code length of said shifted signal;
adding up said code length and outputting an addition result; and
outputting said designated number of bits based on said addition result.

17. A decoding method as claimed in claim 16, said adding further producing a carry, said method further comprising:
determining a value of said carry; and
inputting said variable length code of one word length to said code buffer and transferring contents of said code buffer to a holding unit if said carry is "1".

18. A decoding method as claimed in claim 17, said holding unit having first and second registers, wherein said loading loads said variable length code into said first and second registers and transfers said variable length code from said first and second registers to said shifter in parallel.

19. A decoding method as claimed in claim 18, further comprising controlling said code buffer based on said code length and said carry.

20. A video decoder for decoding a bit stream of a video transformed into compressed codes using a discrete cosine transform, and outputting an uncompressed digital video signal, comprising:
an interference which receives said bit stream;
a controller which examines said bit stream and selects a variable length code;
a variable length code decoder unit which decodes said variable length code and outputs fixed length codes;
an inverse quantizer which quantizes discrete cosine transform coefficients including said fixed length codes to produce a discrete cosine transform block; and
an inverse discrete cosine transform unit which applies an inverse discrete cosine transform on said discrete cosine transform block, wherein said variable length code decoder unit includes
a shifter that shifts said variable length code by a designated number of bits to produce a shifted code,
a decoding unit which outputs a prescribed bit of said shifted code as sign data and decodes said shifted code for outputting a code length and a fixedlength binary value of said shifted code, and
a shift control unit which outputs said designated number of bits to said shifter based on said code length.

21. A video decoder as claimed in claim 20, further comprising:
a code buffer for temporarily holding said variable length code; and
a controller which outputs a timing signal to said code buffer based on said code length for controlling an output timing of said variable length code.

22. A video decoder as claimed in claim 21, wherein:
said shift control unit further produces a carry; and
said controller outputs said timing signal based on said code length and said carry.

23. A video decoder as claimed in claim 21, wherein said code buffer has:
a first register which temporarily holds said variable length code; and
a second register which receives said variable length code temporarily held in said first register and successively holds said variable length code;
wherein said first and second registers supply said variable length codes held in said first and second registers to said shifter in parallel.

24. A video decoder as claimed in claim 23, wherein said first and second registers include flip-flops.

25. A video decoder as claimed in claim 21, said shifted code including a numerical part of said variable length code and said fixed length binary value consists of said sign data and a fixed length numerical value, wherein said decoding unit has:
a numerical part decoding unit for decoding said numerical part to produce said fixed length numerical value;
a code length decoding unit which produces said code length of bits that constitute said variable length code based on said numerical part; and
a shift unit for recieving said shifted code from said shifter and outputting said prescribed bit as said sign data.

* * * * *